(12) United States Patent
Randløv

(10) Patent No.: US 9,480,333 B2
(45) Date of Patent: Nov. 1, 2016

(54) LIFTING COLUMN

(71) Applicant: LINAK A/S, Nordborg (DK)

(72) Inventor: Michael Lindekilde Randløv, Vojens (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 14/396,245

(22) PCT Filed: Apr. 23, 2013

(86) PCT No.: PCT/DK2013/000030
§ 371 (c)(1),
(2) Date: Oct. 22, 2014

(87) PCT Pub. No.: WO2013/159775
PCT Pub. Date: Oct. 13, 2013

(65) Prior Publication Data
US 2015/0108297 A1    Apr. 23, 2015

(30) Foreign Application Priority Data

Apr. 23, 2012    (DK) .................................. 2012 00280

(51) Int. Cl.
*F16M 11/24* (2006.01)
*A47B 9/20* (2006.01)
(Continued)

(52) U.S. Cl.
CPC . *A47B 9/20* (2013.01); *A47B 9/04* (2013.01); *F16H 25/2056* (2013.01); *F16H 2025/2071* (2013.01); *Y10T 74/18672* (2015.01)

(58) Field of Classification Search
CPC ....... A47B 9/20; A47B 9/04; F16H 25/2056; F16H 2025/2071; Y10T 74/18672

USPC ....................................................... 248/188.4
See application file for complete search history.

(56) References Cited

U.S. PATENT DOCUMENTS 5,282,593 A      2/1994  Fast
6,289,825 B1 *   9/2001  Long ........................ A47B 9/00
                                                        108/147

(Continued)

FOREIGN PATENT DOCUMENTS

FR    2747280    10/1997
WO    0071001    11/2000

OTHER PUBLICATIONS

English Abstract of FR 2747280.
(Continued)

*Primary Examiner* — Mark Wendell
(74) *Attorney, Agent, or Firm* — Dykema Gossett PLLC

(57) ABSTRACT

A lifting column, preferably for height-adjustable tables comprises a guide with three mutually telescopic members (1,2,3) and a motor driven spindle unit for bringing about the movement. The second member (2) of the guide is with a lower end secured to a lower end of the second spindle (6). The second spindle nut (8) co-operating with the second spindle (6) is with a bearing (18) with a rigid connection (28) fixed to a shaft stub (16) secured to an upper end of a drive tube (9). The shaft stub (16) is via a second bearing (20) secured to a mounting plate (23), by means of which the spindle unit is secured in the lifting column. Thus, the vertical load on the lifting column is led through the spindle unit around the guide (1,2,3). This enables a better and more optimum dimensioning of the guide (1,2,3) and the spindle unit, just as it is advantageous in terms of assembly and not least it enables a better implementing of a squeeze protection in the lifting columns.

5 Claims, 3 Drawing Sheets

(51) Int. Cl.
    *A47B 9/04*      (2006.01)
    *F16H 25/20*     (2006.01)

(56) References Cited

U.S. PATENT DOCUMENTS

| | | | | |
|---|---|---|---|---|
| 6,484,648 | B1* | 11/2002 | Long | A47B 9/04 108/147 |
| 6,595,144 | B1* | 7/2003 | Doyle | A47B 9/00 108/147 |
| 7,495,359 | B2 | 2/2009 | Klinke et al. | |
| 2003/0183027 | A1* | 10/2003 | Koch | A47B 9/04 74/89.35 |
| 2006/0145036 | A1* | 7/2006 | Jones | A47B 9/00 248/188.5 |
| 2006/0279143 | A1* | 12/2006 | Platz | A47B 9/04 310/51 |
| 2013/0221171 | A1* | 8/2013 | Lorenzen | A47B 9/20 248/188.5 |

OTHER PUBLICATIONS

Deskiline® Control Box CBD6S, Linak.Com Website (Apr. 2014).

* cited by examiner

LIFTING COLUMN

BACKGROUND OF THE INVENTION

1. Field of the Invention

The present invention relates to a lifting column, preferably for height-adjustable tables, and a drive unit for lifting columns, just as the invention relates to a height-adjustable table.

2. The Prior Art

A lifting column is a synchronous lifting column, i.e., the second and third member are synchronously displaced; when the third member is displaced a distance upwards or downwards, the second member is likewise displaced a distance upwards or downwards. This is achieved in that the second member is guided in that the second member is connected to a spindle nut, which co-operates with the first spindle. This type of lifting column is, e.g., known from FIGS. 1, 3 and 6a-6b of EP 1 621 055 B1 Linak A/S. In this structure the third member of the guide is secured with its upper end to the underside of the housing by means of welding. The forces are thus led through the first spindle via the spindle nut thereon to the second spindle. From the spindle nut on the second spindle the forces are led to the third member of the guide and from there to the underside of the housing. The connection from the spindle nut on the second spindle to the third member of the guide should thus be dimensioned to be able to transfer these forces. In case of a bias the connection should also be able to withstand a torque load. This again has a negative influence on the mutual telescopic movement of the members, as the torque load is transferred to the guide. Further, it puts stress on the bottom of the housing to which the third member is secured.

The purpose of the invention is to provide a solution, which counters the above disadvantages.

SUMMARY OF THE INVENTION

This is achieved according to the invention in that the lifting column is designed so that forces are led from the spindle nut on the second spindle to a first bearing via the rigid connection and from there to a shaft stub and via the second bearing to the mounting plate and from there to the housing. The forces are thus not led through the third member of the guide. The third member and its connection to the housing can thus be dimensioned in a more expedient manner, just as the power transferring connection from the spindle nut to the third member of the guide can be omitted. The embodiment according to the invention also provides other possibilities of implementing a squeeze protection in the structure. Thus, a pressure transducer can be located in connection with one of the bearings for registering forces or changes in the forces as a result of the lifting column being prevented from moving, e.g., in terms of a table, in that the table top hits an object in its upwards or downwards direction, For the sake of completeness sit should be mentioned that the lifting column shown in FIGS. 2 and 5a-5d in EP 1 621 055 61 Linak A/S is a nonsynchronous lifting column, i.e., the third member of the guide is extended first and when it reached its fully extended position a dog pulls the second member along. When the lifting column is retracted the third member is pulled into the second member, which then together with the third member is pulled into the first member. The structure can certainly be realized relatively inexpensive as the second member of the guide is not restrictedly guided, but is loose. This mode of operation is however inexpedient, as there is no control of the second member of the guide. Among other things it can happen that the second member is caught in the third member and due to a vibration it can suddenly let go and drop back into the first member of the guide. It makes a loud clonking sound and comes across as ungraceful and unreliable, The invention further relates to a drive unit for lifting columns. The invention further relates to a height-adjustable table equipped with one or more lifting columns.

BRIEF DESCRIPTION OF THE DRAWINGS

An embodiment of the invention will be described more fully below with reference to the accompanying drawings, in which.

DETAILED DESCRIPTION OF THE DEPICTED EMBODIMENTS

Figure 1:
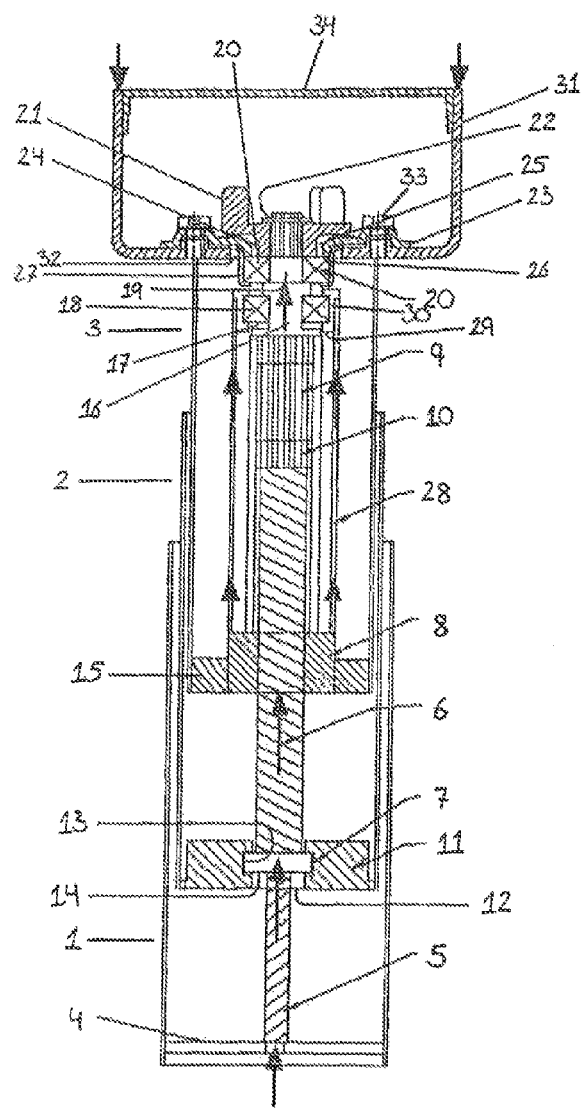
FIG. 1 shows a cross section through an embodiment of a lifting column according to the invention.
Figure 2:
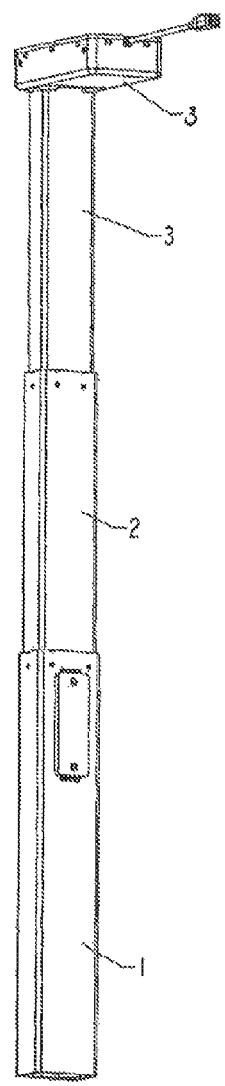
FIG. 2 shows a lifting column shown in its extended position.
Figure 3:
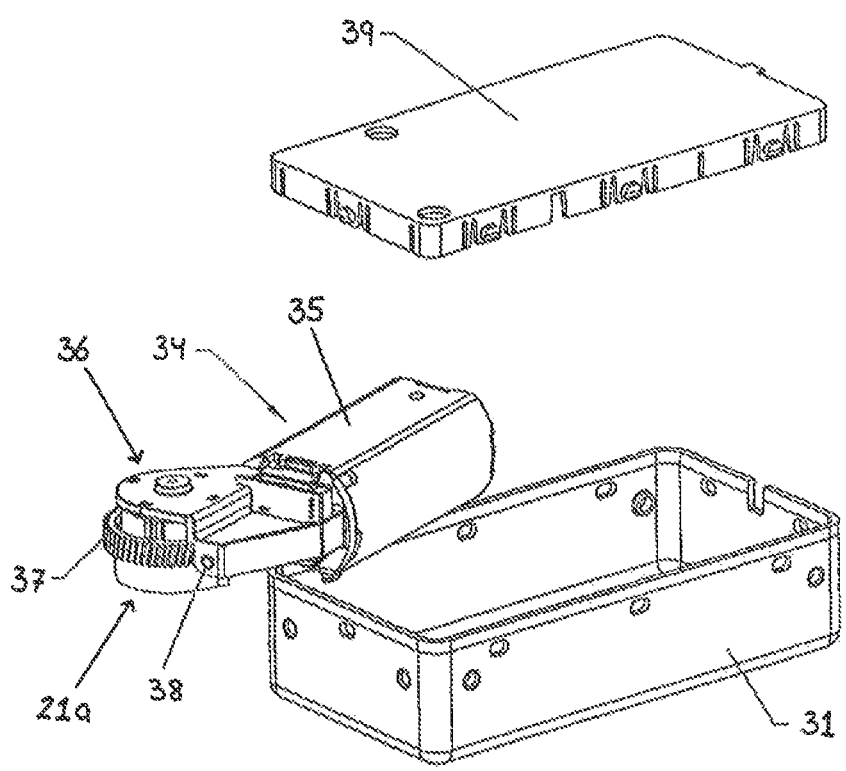
FIG. 3 shows an exploded view of a motor unit and housing for the lifting column.

FIG. 1 of the drawing shows a cross section through a lifting column intended for height-adjustable desks also known as sit/stand desks. The lifting column comprises a guide with three members 1,2,3. These members are constituted by pipe sections, typically of metal such as steel or aluminum arranged mutually telescopic. The pipe sections have a square cross section but they can of cause also have other types of cross sections, such as rectangular, oval or circular. Between the individual members sliders of a plastic material are arranged in order for the members not to run directly against each other to reduce friction and noise. The first member 1 is the outermost member and is equipped with a bottom part 4 at the bottom. The second and third member 2,3 are the intermediate and innermost member, respectively.

A spindle unit with a first spindle 5, preferably a solid spindle, is with a lower end secured to the bottom part 4 in the first member 1. Further, the spindle unit has a second spindle 6 in the shape of a hollow spindle with external threads. At the lower end of the second spindle 6 a first spindle nut 7 with internal threads is secured. This first spindle nut 7 engages the threads on the first spindle 5. A second spindle nut 8 engages the external threads on the second spindle 6. A drive tube 9 is secured to the second spindle, the internal of said drive tube being furnished with axially running tongue/grooves as a first part of a spline connection. At an upper end of the second spindle 6 a cylindrical coupler 10 is secured, which extends over the top of the second spindle 6. The part of the cylindrical coupler 10 extending over the top of the second spindle 6 is at its outer side furnished with tongue/grooves as a second part of a spline connection in mesh with the first part of the spline connection in the drive tube 9.

When the drive tube 9 is rotated, it will, via the spline connection, cause the second spindle 6 to rotate. The second spindle 6 is thus screwed out of the bottom of the second spindle nut 8, which is secured against rotation. Since the second spindle 6 is prevented from moving downwards, the second spindle nut 8 will instead move upwards. As the first spindle nut 7 is secured to the end of the second spindle 6 the spindle nut 7 will rotate with the second spindle 6. The first spindle nut 7 will thus screw itself up the first spindle 5 thus pushing the second spindle 6 upwards. Thus, there are two movements in the upward direction. In case the direction of rotation of the drive tube is reversed, the lifting column will be retracted instead of extended.

At the lower end of the second member 2 there is a connection piece 11 in the shape of an end piece. In the connection piece 11 there is a through-going opening 12. The first spindle nut 7 is retained with its outer edge 13 in a ring shaped groove 14 in the opening 12. For this purpose the connection piece 11 is constructed as two halves, which with the ring shaped groove 14 is positioned around the outer edge 13 of the first spindle nut 7. The connection piece 11 is fixed at the end of the second member 2 either by means of snap-locking connections or screws. When the connection piece 11 is fixed at the end of the second member 2, this will contribute to holding the two halves together or rather; the second member 2 of the guide is connected to the second spindle 6 via the connection piece 11.

For centering the second spindle nut 8 at the end of the third member 3 and for securing the spindle nut 8 against rotation this is connected to the third member 3. For this purpose the second spindle nut 8 is constructed in a bottom part 15, which is secured to the end of the third member 3. The securing is also done by means of snap-locking connections or screws.

At the end of the drive tube 9 a shaft stub 16 is secured. On the part of the shaft stub 16 protruding out of the top of the drive tube 9 there is a first bearing 18 in the shape of a thrust (compression/tensile) bearing such as a ball bearing retained in a groove 17. On a subsequent recessed part 19 of the shaft stub 16 a second bearing 20 is mounted. At the outermost part of the recessed part 19 a first part 21*a* of a clutch 21, here a claw clutch, is mounted, which is furnished with a press fit and is secured by means of a locking ring 22 at the end of the shaft stub 16.

The second bearing 20 is mounted in connection with a mounting plate 23, in which a hole 24 is punched and deep drawn in the middle for receiving the first part 21*a* of the claw clutch 21 on the end of the shaft stub 16. The hole 24 has a ring-shaped wall 24 with an end face 26 on which the second bearing 20 rests. The bearing 20 is retained by means of a bearing bush 27. The bearing bush can with a flange be secured to the mounting plate 23 e.g. by means of spot welding.

The spindle nut 8 on the second spindle 6 is secured to the first bearing 18 with a rigid connection in the shape of a tube 28. At the upper end of the tube 28 a bushing 29 with a ring shaped groove 30 is mounted for receiving the bearing 18 on its outer side. The bushing is in two parts and is assembled around the bearing 18 with the ring shaped groove 30 and is retained at the end of the tube 28 by means of snap-locking connections or screws.

The spindle unit is mounted in a housing 31 having a hole 32 at the bottom for the upper end of the spindle unit, such that the mounting plate 23 rests on the internal side of the bottom of the housing and is secured thereto by means of screws 33. The third member 3 of the guide is secured with its upper end to the external side of the bottom of the housing 31. The securing is expediently done by means of welding.

The housing 31 is open at the top and contains a motor unit 34 with a reversible electric motor 35, a transmission 36, typically a worm gear with a worm wheel 37 and a worm 38 in extension of the motor shaft. To the transmission 36 a second part 21*b* of the claw clutch is secured, said second part being in mesh with the first part 21*a* of the claw clutch 21 at the end of the spindle unit. The second part 21*b* of the claw clutch has a cylindrical part on one side of the worm wheel 37. Various electronics can further be arranged in the housing 31. After the assembly the housing can be closed with a cover 39.

In the drawing arrows indicate the force path of the vertical load on the lifting column. In that connection it is noted that the lifting column is typically secured to a table top by means of screws in the side walls of the housing 31. In this context it is noted that the housing 31 usually is located between brackets or the longitudinal members of a carrying frame under the table top. As it appears the forces run through the spindle unit, its mounting plate 23 and into the housing 31, i.e. its bottom and side walls. The guide will thus not be subjected to the vertical load.

The construction is further expedient in terms of implementing a squeeze protection. For this purpose a pressure transducer, e.g. a piezo element, can be arranged in connection with the bearing. This can e.g. be arranged between the upper side of the bearing 20 and the end face 26 of the tubular wall constituting the hole in the mounting plate.

Figure 4:
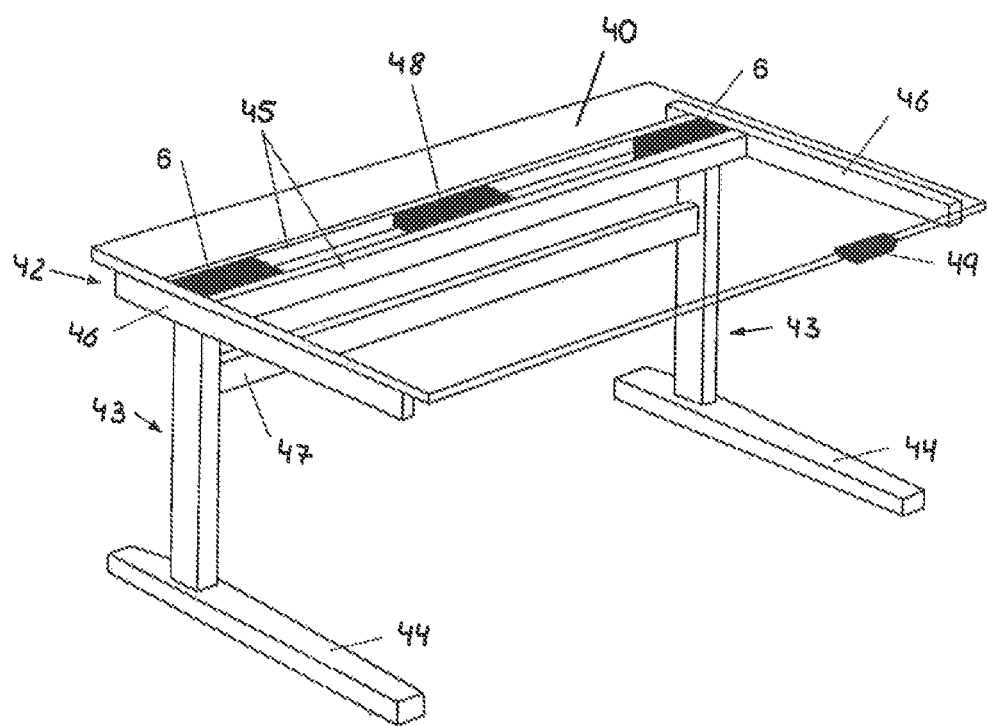
FIG. 4 shows a height-adjustable table equipped with a lifting column at each side of the table.

FIG. 4 shows a perspective view of a height-adjustable table comprising a table top 40 and an under frame 41 consisting of a carrying frame 42, two lifting columns 43 as table legs, one at each side and two feet 44 mounted at the lower end of the respective lifting columns 43. The carrying frame 42 comprises two parallel longitudinal members 45 and at each end thereof a cross member 46. The two lifting columns 43 are here mutually connected by means of an architrave 47, but it can if so be omitted. The lifting columns 43 are positioned with their housing 31 up between the longitudinal members 45, the mutual distance of which are adapted to the width of the housing 31. The lifting columns are secured by means of screws through the longitudinal members and through the sides of the housing. For controlling the lifting columns these are connected to a control box 48 comprising a control unit and a power supply. For operating the table there is an operation panel 49 in connection with the control box 48.

Even though the invention here is illustrated in connection with a lifting column for height-adjustable tables, it should be understood that the invention is not limited to this, but can also be used in other connections such as, e.g., carrying stands for flat screen TVs, monitors, etc. As another example can be mentioned height-adjustable beds.

The invention claimed is:

1. A lifting column comprising:
   a guide consisting of a first member, a second member and a third member telescopically arranged relative to each other, and
   a spindle unit comprising a first spindle, which with an end is secured to an end of the first member of the guide, a second spindle with a first spindle nut secured thereto, said first spindle nut cooperating with the first spindle, a second spindle nut secured against rotation and cooperating with the second spindle, a drive tube which cooperates with the second spindle for driving the second spindle, a first part of a clutch at an upper end of the drive tube, a motor unit with a reversible electric motor and a transmission, the transmission including a second part of the clutch for cooperating with the first part of the clutch at the upper end of the drive tube for driving the drive tube, wherein the second member of the guide with a lower end is secured to a lower end of the second spindle, wherein the second spindle nut cooperates with the second spindle and is connected to a first bearing by means of a rigid connection tube which is fixed to a shaft stub secured to an end of the drive tube, wherein the shaft stub is secured via a second bearing, and wherein at the upper end of the rigid connection tube is mounted a bushing with a ring shaped groove for receiving an outer side of the second bearing.

2. The lifting column according to claim 1, wherein the bushing is in two parts and is assembled around the second bearing with the ring shaped groove and secured at the end of the rigid connection tube by means of a snap-locking connection or screws.

3. The lifting column according to claim 1, wherein a mounting plate is arranged at an upper end of the drive tube for mounting of the spindle unit.

4. The lifting column according to claim 1, wherein the motor unit comprises a housing, said housing being furnished with a hole, and wherein an upper end of the spindle unit extends into the housing and is secured to the housing by means of the mounting plate.

5. A lifting column which comprises:
- a guide assembly which includes a first guide member, a second guide member telescopingly movable relative to the first guide member, and a third guide member telescopingly movable relative to the second guide member,
- a spindle unit within said guide assembly, said spindle unit comprising:
- a first spindle element having a first end secured in a first end of said first guide member,
- a second spindle element having a first spindle nut secured to an end thereof, said first spindle nut engaging said first spindle element such that rotation of said second spindle element and said first spindle nut will cause telescopic movement of said second guide member relative to said first guide member,
- a second spindle nut attached to a first end of said third guide member,
- a drive tube in driving connection with said second spindle element,
- a shaft stub with a first end connected to an end of said drive tube and with a second end connected to a first clutch part,
- a connection tube which extends from said second spindle nut to said shaft stub,
- a first bearing located between a first end of said shaft stub and said connection tube, and
- a second bearing located on a second end of the shaft stub, and
- a reversible electric motor and transmission including a second clutch part which cooperates with said first clutch part to rotate said shaft stub and thereby the drive tube, wherein vertical loads on said lifting column will pass through said first and second spindle elements, said connection tube and said shaft stub.

\* \* \* \* \*